(12) United States Patent  
Kliemannel et al.

(10) Patent No.: US 7,441,474 B2
(45) Date of Patent: Oct. 28, 2008

(54) SENSOR SYSTEM FOR THE CONTROL OF AN AUTOMATIC TRANSMISSION

(75) Inventors: Wolfgang Kliemannel, Lemförde (DE); Rolf Bosse, Wolfsburg (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 1190 days.

(21) Appl. No.: 10/148,939

(22) PCT Filed: Oct. 4, 2001

(86) PCT No.: PCT/DE01/03794

§ 371 (c)(1),
(2), (4) Date: Jun. 4, 2002

(87) PCT Pub. No.: WO02/29288

PCT Pub. Date: Apr. 11, 2002

(65) Prior Publication Data

US 2002/0189381 A1    Dec. 19, 2002

(30) Foreign Application Priority Data

Oct. 4, 2000    (DE) ........................... 100 49 307

(51) Int. Cl.
*F16H 59/00*    (2006.01)
*F16H 61/00*    (2006.01)
*F16H 63/00*    (2006.01)
*B60K 17/04*    (2006.01)
*B60K 17/12*    (2006.01)
*B60Q 1/00*    (2006.01)

(52) U.S. Cl. ....................... 74/335; 74/473.12; 340/456

(58) Field of Classification Search .................. 74/335, 74/473.12; 340/456, 686.1; 335/205, 206, 335/207
See application file for complete search history.

(56) References Cited

U.S. PATENT DOCUMENTS

| | | | | |
|---|---|---|---|---|
| 5,243,871 A | * | 9/1993 | Weiten | 74/473.12 |
| 5,899,115 A | * | 5/1999 | Kataumi et al. | 74/473.12 |
| 6,205,874 B1 | * | 3/2001 | Kupper et al. | 74/335 |
| 6,550,351 B1 | * | 4/2003 | O'Reilly et al. | 74/335 |

FOREIGN PATENT DOCUMENTS

| | | |
|---|---|---|
| DE | 196 03 197 C1 | 2/1997 |
| DE | 196 53 193 A1 | 7/1998 |
| DE | 199 05 627 A1 | 8/1999 |
| DE | 199 38 528 A1 | 2/2001 |
| EP | 0 794 362 A2 | 9/1997 |
| WO | WO 99/03696 | 1/1999 |

* cited by examiner

Primary Examiner—Tisha D Lewis
(74) Attorney, Agent, or Firm—McGlew & Tuttle, P.C.

(57) ABSTRACT

A sensor system is provided for a control device of an automatically shiftable transmission and/or with automatic manually shifted transmission. The system includes a shift selector lever movable in at least one shift gate for setting at least the positions Forward, Neutral, reverse, and park (stop). A position for manual shifting may also be provided for access to at least one position for the manual upshifting and/or a position for the manual downshifting of the gears of the transmission. A first sensor element is associated with each possible position. A first signal transmitter is arranged at the shift selector lever to detect the position of the shift selector lever. The first sensor elements and/or the first signal transmitter are arranged to detect a positioning of the shift selector lever at least between the positions Forward, Neutral and/or Reverse.

20 Claims, 4 Drawing Sheets

| Shift position | Signal states | Shifting paths |
|---|---|---|
| Stop | G1* and G2 and G3 and R1 and R2 | |
| R | G1 and G2* and G3* and R1 and R3 | |
| N | G1 and G2* and G3* and N1 and R2 | |
| E | G1 and G2* and G3* and E1 and E2 | |
| M | G1* and G2 and G3 and E1 and E2 and E3 | |
| - | G1* and G2 and G3 and E1 and E2* and E3 | |
| + | G1* and G2 and G3 and E1* and E2 and E3 | |

(*) Negated signals

Figure 4b

| Shift position | Hall Sensor | | | | | | | | | |
|---|---|---|---|---|---|---|---|---|---|---|
| | G1 | G2 | G3 | R1 | N1 | E1 | E2 | R2 | N2 | E3 |
| Stop | 0 | 1 | 1 | 1 | 0 | 0 | 0 | 1 | 0 | 0 |
| → From Stop to R | 1 | 1 | 1 | 1 | 0 | 0 | 0 | 1 | 0 | 0 |
| R | 1 | 0 | 0 | 1 | 0 | 0 | 0 | 1 | 0 | 0 |
| → From R to N | 1 | 0 | 0 | 1 | 1 | 0 | 0 | 1 | 1 | 0 |
| N | 1 | 0 | 0 | 0 | 1 | 0 | 0 | 0 | 1 | 0 |
| → From N to E | 1 | 0 | 0 | 0 | 1 | 1 | 0 | 0 | 1 | 1 |
| E | 1 | 0 | 0 | 0 | 0 | 1 | 1 | 0 | 0 | 1 |
| → From E to M | 1 | 1 | 1 | 0 | 0 | 1 | 0 | 0 | 0 | 1 |
| M | 0 | 1 | 1 | 0 | 0 | 1 | 1 | 0 | 0 | 1 |
| M+ | 0 | 1 | 1 | 0 | 0 | 0 | 1 | 0 | 0 | 1 |
| M- | 0 | 1 | 1 | 0 | 0 | 1 | 0 | 0 | 0 | 1 |

1 = Tripped Hall sensor
0 = Non-tripped Hall sensor

Change from one gate to another
Signal intersection area
Shift position
Intermediate sensor
Manual shifting area

SENSOR SYSTEM FOR THE CONTROL OF AN AUTOMATIC TRANSMISSION

FIELD OF THE INVENTION

The present invention pertains to a sensor system for the control device of an automatically shiftable transmission, especially for an automatic manually shifted transmission, with a shift selector lever movable in at least one shift gate for setting at least the positions Forward (E), Neutral (N), Reverse (R), preferably for additionally setting a parking brake (STOP), preferably a position (M) for manual shifting, and at least one position (+) for manually upshifting and/or a position (−) for manually downshifting the gears of the transmission, wherein at least one first sensor element is associated with each possible position (E, N and R) to detect the position of the shift selector lever, and at least one signal transmitter is arranged at the shift selector lever.

BACKGROUND OF THE INVENTION

The shift gates known hitherto according to the state of the art have corresponding recesses for gear limitation, i.e., for setting the exact position of the shift selector lever within the shift gate, so that the position of the shift selector lever is always limited or defined. In the more recent shift selector levers known according to the state of the art, this gear limitation is sometimes eliminated, especially if the transmission is designed as an automatic transmission and a "tip shifting actuation" is used. With this the driver can manually downshift and upshift the gears by means of the tipping gate. The "tip shifting" thus embodied applies a ground potential to the input of the control device during the actuation of the corresponding tipping button or of the corresponding tip switch. The tip switches of the "tip shifting" are, in general, first sensor elements, which, designed as Hall elements or Hall position transducers or Hall switches, are provided in the shift cover and can be actuated or triggered by a first signal transmitter, which is preferably designed as a permanent magnet. It is problematic here at first that these first sensor elements designed as Hall position transducers cannot be optimally diagnosed at present, i.e., it is not always possible to optimally determine whether these are also able to function at a given moment, so that the corresponding gear limitation, i.e., the recesses in a shift gate which were mentioned in the introduction, cannot always be done away with for safety reasons.

To prevent this problem or to solve this problem, several sensor systems for control device have been known from the state of the art and, in particular, a control device is described in the yet unpublished Patent Application DE 199 38 528, in which a "dynamic diagnosis" takes place when the shift selector lever is moved outside the position "M" for manual shifting, namely, outside the tipping gate. Hall position transducers are provided for this purpose for the first and second tip switches as well as for position "M" between the first and second tip switches, which can be correspondingly triggered with a first signal transmitter, which is associated with a shift selector lever and is designed as a permanent magnet. In addition, a second permanent magnet is provided as a checking magnet. An evaluating circuit provided separately with a sequence generator generates the corresponding signals here based on the checking signals applied. At the moment at which all Hall position transducers are detected as being satisfactory, namely, the corresponding frequency pattern is present, the shift selector lever can then be engaged from the Forward position (E) into the position "M" for manual shifting. If the corresponding frequency pattern is not present after the "dynamic diagnosis" of all Hall position transducers, it is detected that at least one Hall position transducer or a control line associated with that Hall position transducer is not functioning satisfactorily and an acoustic and/or optical warning signal is generated for the driver before engaging the selector lever in position "M" for manual shifting to indicate that the manual shifting actuations do not function.

On the one hand, the above-described "dynamic diagnosis" of the prior-art control device or of the sensor system being described here is not yet optimal, and, on the other hand, it is disadvantageous or problematic that the drivers of the motor vehicles tend to rest their hand on the shift selector lever while driving the motor vehicle. As a result of this, it may happen that the shift selector lever is slightly displaced, i.e., e.g., from the Forward position (E) into the Neutral position (N) or even from the Neutral position (N) in the direction of the Reverse position (R). This means that the shift selector lever will thus assume an "intermediate position" between the Forward E, Neutral N and Reverse R positions actually defined. This may be unfavorable from the viewpoint of safety engineering, because the control device for embodying the corresponding shifting states of the transmission which are desired by the driver in this situation no longer receives any signals any more for the "intermediate position" engaged by the shift selector lever at all, because it is not reported to the control device that the shift selector lever is engaged in position "N," i.e., in the neutral position, or in position "R" for reverse, i.e., the control device cannot always detect the exact position of the shift selector lever at every point in time.

SUMMARY OF THE INVENTION

The basic object of the present invention is therefore to design and improve the prior-art sensor system of the type mentioned in the introduction such that, on the one hand, the gear limitations known hitherto are unnecessary, but, on the other hand, shifting problems that may possibly occur due to the peculiarities determined by the particular type of driver are avoided.

The object described above is accomplished by the first sensor elements and/or the signal transmitter being designed and arranged such that the positioning of the shift selector lever can also be detected at least between the Forward (E), Neutral (N) and/or Reverse (R) positions. In other words, the first sensor elements and the first signal transmitter are designed and coordinated with one another such that the "intermediate positions" of the shift selector lever mentioned in the introduction, i.e., the positions occupied by the shift selector lever between defined positions within the shift gate, can also be detected, and correspondingly, exactly defined signals can thus be sent to the control device. The above-described drawbacks, especially the driver type-specific peculiarities and the associated shifting technical problems, can be avoided as a result, and further additional advantages arise herefrom, especially concerning the ability to diagnose the first sensor elements used, which shall be explained and will become clear below.

There is a large number of possibilities for designing and improving the sensor system according to the present invention in an advantageous manner. A preferred embodiment of the sensor system shall be specifically explained in greater detail on the basis of the following drawings and specification.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings in particular, FIGS. 1 through 4 show a sensor system 1 for a control device of an automatically shiftable transmission of a motor vehicle. The control device is not shown here with all of its details. The transmission is likewise not shown here. The sensor system 1 being shown here is designed especially for an automatic manually shifted transmission. The sensor system 1 being shown may be used, in principle, in any automatically shiftable transmission of a motor vehicle. In other words, the sensor system 1 being shown here can be used for a control device that has a shift selector lever that can be moved in a single shift gate 2 only, but it can also be used in a control device where a shift gate 2, a tipping gate 6 and a transverse gate 5 are provided. This will specifically become clear below.

Figure 1:
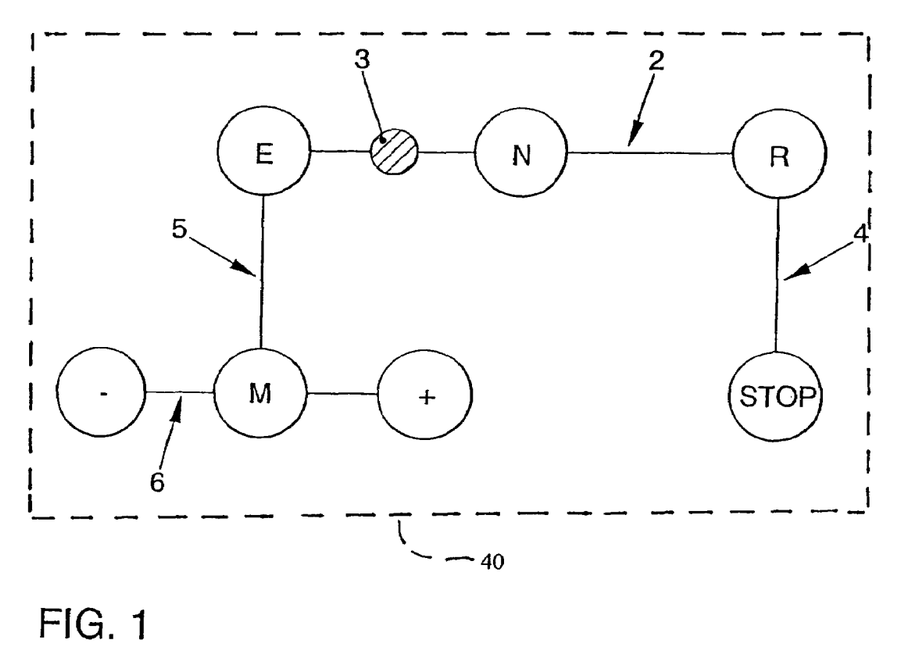
FIG. 1 is a schematically simplified view of a circuit diagram of a control device with a shift selector lever for an automatic manually shifted transmission according to the invention.

The control device has, in principle, at least one shift selector lever 3, which can be moved in at least one shift gate 2, as is apparent from FIG. 1. The shift selector lever 3 can be moved here at least into the positions Forward E, Neutral N and Reverse R within the shift gate 2 for setting the different states of the transmission within the transmission or for the different driving conditions of the motor vehicle. Via an end gate 4, the shift selector lever 3 can additionally also be moved here into the position "STOP," e.g., for embodying a parking brake, but at least to engage a gear within the transmission. Furthermore, a transverse gate 5 is provided, a position M is additionally provided for manual shifting, here within a tipping gate 6, and a position "+" for manually upshifting the gears, and a position "−" for manually downshifting the gears, into which positions the shift selector lever 3 can be moved, are provided here within a tipping gate 6. The control device shown schematically in FIG. 1 is designed for an automatic manually shifted transmission, i.e., it has a shift gate 2 and additionally a tipping gate 6, which are connected via a transverse gate 5. However, the sensor system 1 is, in principle, also suitable for the control device of an automatically shiftable transmission of a motor vehicle, which has, e.g., only one shift gate 2.

To detect the position of the shift selector lever 3, at least one first sensor element E1, E2, N1, R1 is associated with each possible position E, N, R as well as "+" and "−," and at least one first signal transmitter A is arranged at the shift selector lever 3.

Figure 2:
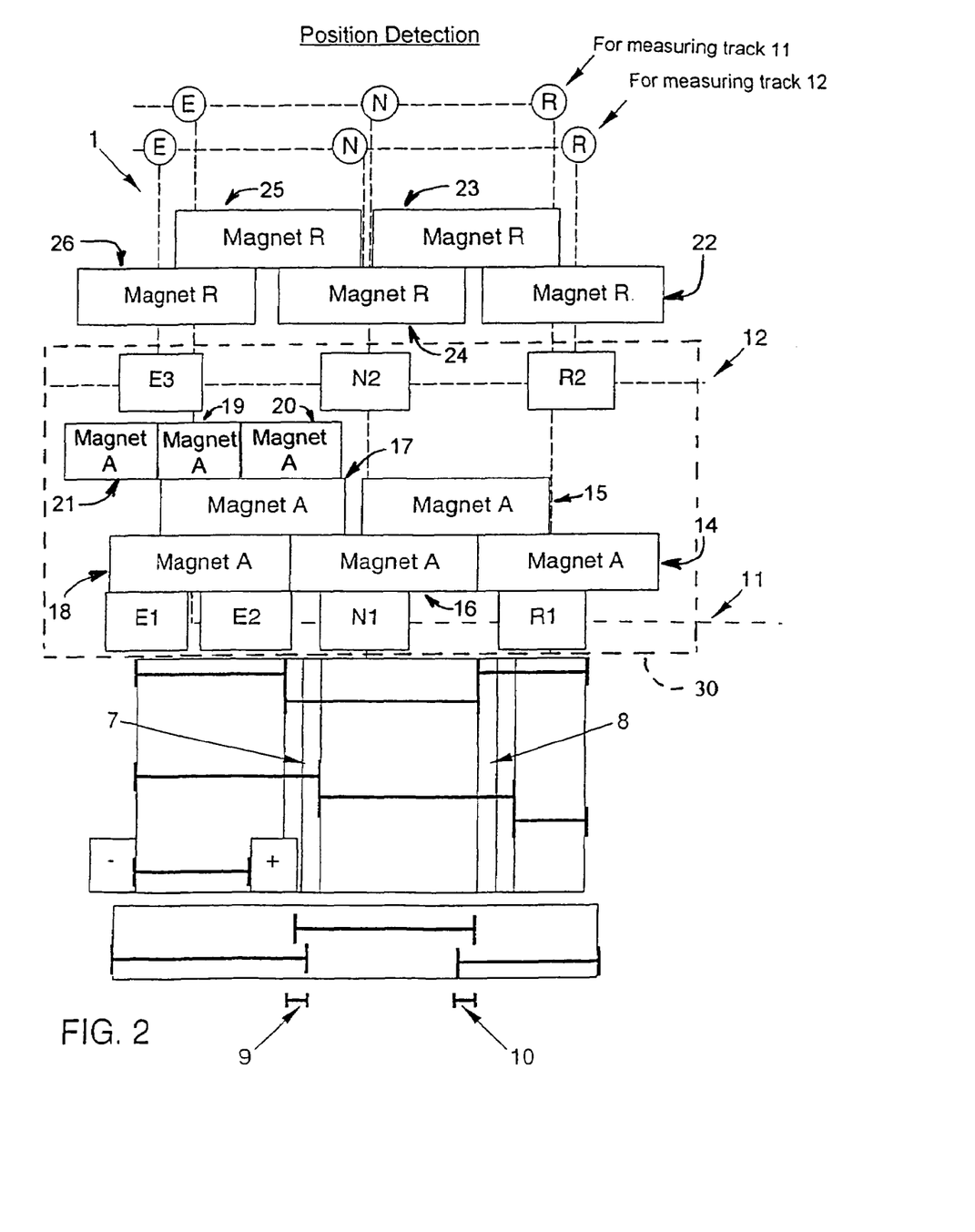
FIG. 2 is a schematically simplified view of the arrangement and the design of the sensor elements and the signal transmitters, including the view of the detection overlap areas for the shift gate or tipping gate of the control device of an automatic manually shifted transmission according to the invention.

The drawbacks described in the introduction are now avoided by the first sensor elements E1, E2, N1 and R2 and/or the first signal transmitter A being designed and arranged such that the positioning of the shift selector lever 3 can also be detected at least between the positions Forward E, Neutral N and/or reverse R. FIG. 2 clearly shows the corresponding design and arrangement of the first sensor elements E1, E2, N1 and R1 as well as of the first signal transmitter A. The first sensor elements E1, E2, N1 and R1 are designed as Hall position transducers here, the first signal transmitter A being designed as a "Magnet A" permanent magnet. The arrangement has the peculiarity that two first sensor elements E1 and E2, which can also be associated individually in themselves to the respective positions "+" and "−" in case of a corresponding displacement, which shall become clear below, are associated with the position Forward E.

FIG. 2 shows clearly that based on the dimensioning and/or the design of the first sensor elements E1, E2, N1 and R2 and/or of the first signal transmitter A, detection overlap areas 7 and 8 are formed. FIG. 2 shows clearly the detection overlap area 7 between the positions Forward E and Neutral N as well as the detection overlap area 8 between the positions Neutral N and Reverse R.

It is conceivable, in principle, that the detection overlap areas 7 and 8 are embodied in different manners. On the one hand, it can be embodied by a corresponding dimensioning of the signal transmitter A, as it happened here, i.e., by making the Magnet A correspondingly large, that the first sensor element R1 is tripped during a corresponding movement of the shift selector lever 3, e.g., from the position Neutral N into the position Reverse R, before the first sensor element N1 is not tripped any more (before first sensor element N1 is no longer activated). However, the opposite case is also conceivable, namely, that the first sensor elements E1, E2, N1 and R1 are correspondingly dimensioned as correspondingly large sensor elements, so that the first signal transmitter A, i.e., the Magnet A here, could be dimensioned as a correspondingly small signal transmitter and corresponding detection overlap areas 7 and 8 are nevertheless embodied. This may be quite different. The detection overlap areas 7 and 8 have smaller partial areas in this case, which are not specifically designated, and which arise from the hysteresis behavior of the Hall position transducers, i.e., from the specific switching-in and switching-off behavior of the sensors.

An additional principle according to the present invention is embodied in the preferred embodiment of the sensor system shown. Namely, additional second sensor elements E3, N2 and R2 are associated with each possible position E, N and R of the shift selector lever 3, and a second signal transmitter R is additionally arranged at (or associated with the position of) the shift selector lever 3. The second sensor elements E3, N2, R2 are also designed as Hall position transducers, the second signal transmitter R being designed as a permanent magnet "Magnet R." As in the case of the first sensor elements E1, E2, N1 and R2 and the first signal transmitter A as well, corresponding detection overlap areas 9 and 10 are also formed between the positions Forward E, Neutral N as well as between the positions Neutral N and Reverse R based on the dimensioning and/or the arrangement of the second sensor elements E3, N2, R2 as well as of the second signal transmitter R. FIG. 2 clearly shows here in the lower section the overlap areas shown, namely, the detection overlap area 9 between the positions E and N as well as the detection overlap area 10 between the positions N and R. The detection overlap areas 7 and 8 shown in the lower section of FIG. 2 apply to the cooperation of the first signal transmitter A and the first sensor elements E1, E2, N1 and R1, and the detection overlap areas 9 and 10 are determined by the mode of action of the second signal transmitter R and of the second sensor elements E3, N2 and R2. The different possible positions and movements of the shift selector lever 3, which are represented in FIG. 2 by different possible positionings of the first signal transmitter A and of the second signal transmitter R, appear from the upper part of the view shown schematically in FIG. 2.

The first and second sensor elements E1, E2, E3, N1, N2, R1, R2 are arranged on a corresponding board 30 arranged in the shift selector lever housing. This board 30 is not movable in the direction of the shift gate 2 or the tipping gate 6, namely, it is not pivotable in that direction, but it is movable, namely, pivotable in the direction of the transverse gate 5, when the shift selector lever 3 is being moved within the transverse gate 5.

It is an essential feature of the embodiment of the sensor system 1 shown that a main measuring track 11 is formed by the first sensor element E1, E2, N1 and R1, and a redundancy measuring track 12 is formed by the second sensor elements E3, N2 and R2. A loss of function of a first sensor element E1, E2, N1, R1 as well as of a second sensor element E3, N2, R2 can not only be compensated but also detected (cf. logic switching table in FIGS. 4a and 4b) based on these two measuring tracks 11 and 12, namely, the main measuring track 11 and the redundancy measuring track 12. This shall be discussed in greater detail below.

As is shown in FIG. 1, the shift selector lever 3 can be moved via a transverse gate 5 into the tipping gate 6, and a respective first individual sensor element E1 and E2 is provided for the position for upshifting, "+," and for the position for downshifting, "−" (cf FIG. 2). The board 30 on which all first and second sensor elements E1, E2, E3, N1, N2, R1, R2 are arranged, is arranged movably, preferably pivotably in the direction of the transverse gate 5 within the shift selector lever housing 40 but not pivotably in the direction of the tipping gate 6 or the shift gate 2. Based on this possibility of pivoting, the positioning of the shift selector lever 3 in the positions "+" and "−" can be detected by means of the first sensor elements E1 and E2.

The positioning of the shift selector lever 3 within the transverse gate 5 as well as the positioning of the shift selector lever 3 within the end gate 4 for embodying the driving condition "STOP" can be detected by means of third sensor elements G1, G2 and G3 and third signal transmitters, designated as "Magnet G1" and "Magnet G2" here. The third sensor elements are also designed as Hall position transducers, and the third signal transmitters are likewise designed as permanent magnets. Like the first and second sensor elements, the third sensor elements G1, G2 and G3 are also arranged on the board 40 the third signal transmitters being arranged in corresponding positions at the shift selector lever housing, namely, they are fixed in defined positions here.

Figure 3:
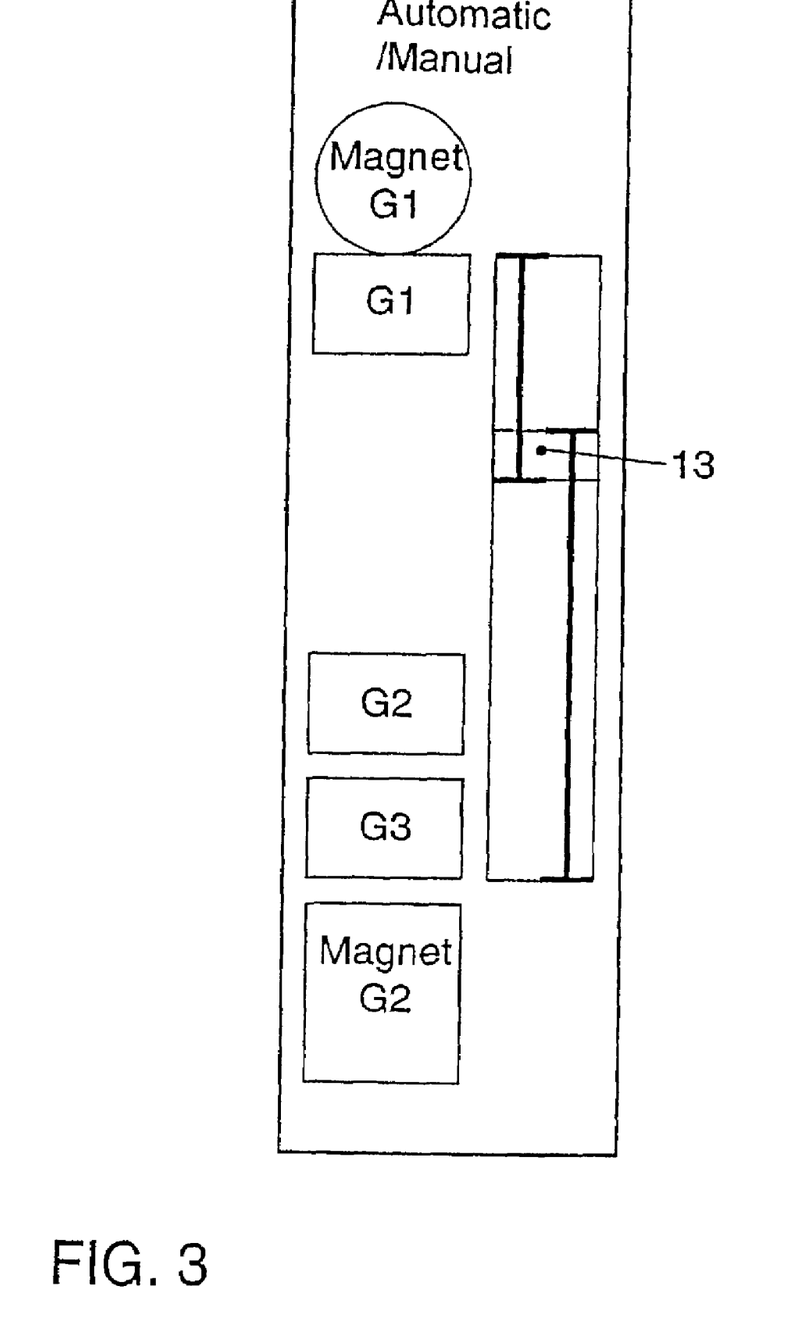
FIG. 3 is a schematically simplified view of the arrangement of the sensor elements and signal transmitters for detecting the position of the shift selector lever in the transverse gate or in the end gate.

As is shown in FIG. 3, a detection overlap area 13 is also formed by the third sensor elements G1, G2 and G3 and the third signal transmitters. In other words, the position of the shift selector lever 3 can also be detected within the transverse gate 5 as well as within the end gate 4 at any point, because an overlap area 13 is formed here as well due to the design and the dimensioning of the third sensor elements G1, G2 and G3 as well as of the third signal transmitters "Magnet G1" and "Magnet G2."

In addition to FIG. 2, it may be pointed out that the shifting and detection overlap areas can be clearly recognized thanks to the different shading of the areas. The sensor system 1 shown in FIGS. 1 through 4 is embodied electronically, and all sensor elements are connected to a control device in terms of circuitry, not shown here, so that the current position of the shift selector lever 3 is always signaled to the control device. This appears, e.g., from the logic table shown in FIG. 4a with the corresponding "signal matrix" listed. It is advantageous that a defective sensor element and/or a short circuit in the control lines, which are not shown, can also be detected by means of the control device, which will be explained below on the basis of FIGS. 4a and 4b. It is particularly advantageous that the control device can be manufactured by means of the sensor system according to the present invention as a separate, only checkable component, because, e.g., the control device itself may have a separate control device, which is designed as a processor unit, and this/these can be integrated in the shift selector lever housing. This has advantages in terms of manufacturing technology, on the one hand, and, on the other hand, the signal transmission is also possible via a CAN bus.

It is decisive that the entire shifting area of the shift selector lever 3, namely, its positions, can be detected with control elements, namely, Hall position transducers, and the positions of the Hall position transducers and of the release mechanisms are fixed such that signal intersection between two adjacent sensor elements, namely, Hall sensors, is ensured. As a consequence, there are no undefined detection areas. In the preferred embodiment, a position recognition of the shift selector lever 3 is set with the switching off of the Hall position transducer of the respective preceding position, which will become clear in the explanation of FIGS. 4a and 4b. To detect an unambiguous assignment of the shift positions of the shift selector lever 3 in case of an error of one of the sensor elements, additional second sensor elements, which are likewise designed as Hall position transducers, are arranged in parallel in the shift positions E, N and R, so that a redundant safety system is formed, namely, a redundant signal recognition is possible. The first and second sensor elements may be advantageously arranged on different levels and tripped by different first and second signal transmitters designed as permanent magnets, here the "Magnet R" and the "Magnet A."

FIG. 2 shows the various positions for the magnets A and R. Magnet A triggers sensor elements E1, E2, N1 and R1 on the main measuring track, while magnet R triggers sensor elements E3, N2 and R2 on the redundancy measuring track. Depending on the location of the shift selector lever, magnets A and R assume various positions thus affecting different sensor elements, the positions are as follows;

| Magnet | Drawing Reference # | Corresponding Sensor Elements |
| --- | --- | --- |
| A | 14 | R1 |
| A | 15 | R1 and N1 |
| A | 16 | N1 |
| A | 17 | E2 |
| A | 18 | E2 and E1 |
| A | 19 | "M" in Tipping Gate 6 |
| A | 20 | "+" in Tipping Gate 6 |
| A | 21 | "−" in Tipping Gate 6 |

-continued

| Magnet | Drawing Reference # | Corresponding Sensor Elements |
|---|---|---|
| R | 22 | R2 |
| R | 23 | R2 and N2 |
| R | 24 | N2 |
| R | 25 | N2 and E3 |
| R | 26 | E3 |

Figure 4A:
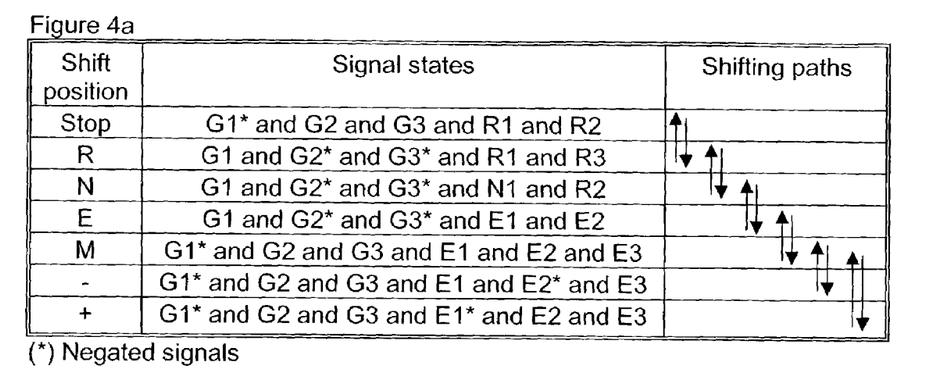
FIG. 4a is a logic table for different positions of the shift selector lever when different shift positions are assumed, i.e., a corresponding listing of the signals that are reported to the control device.

FIG. 4a shows the logic switching table, and the shift selector lever 3 may assume different shift positions here, namely, the position "STOP,", R, N, E, M, "+" and "−." The signal states of the corresponding first and second sensor elements are shown here, the signals designated by "*" being negated signals, i.e., non-tripped Hall sensors. Finally, the shifting paths of the shift selector lever 3 are also shown in the far right part.

Figure 4B:
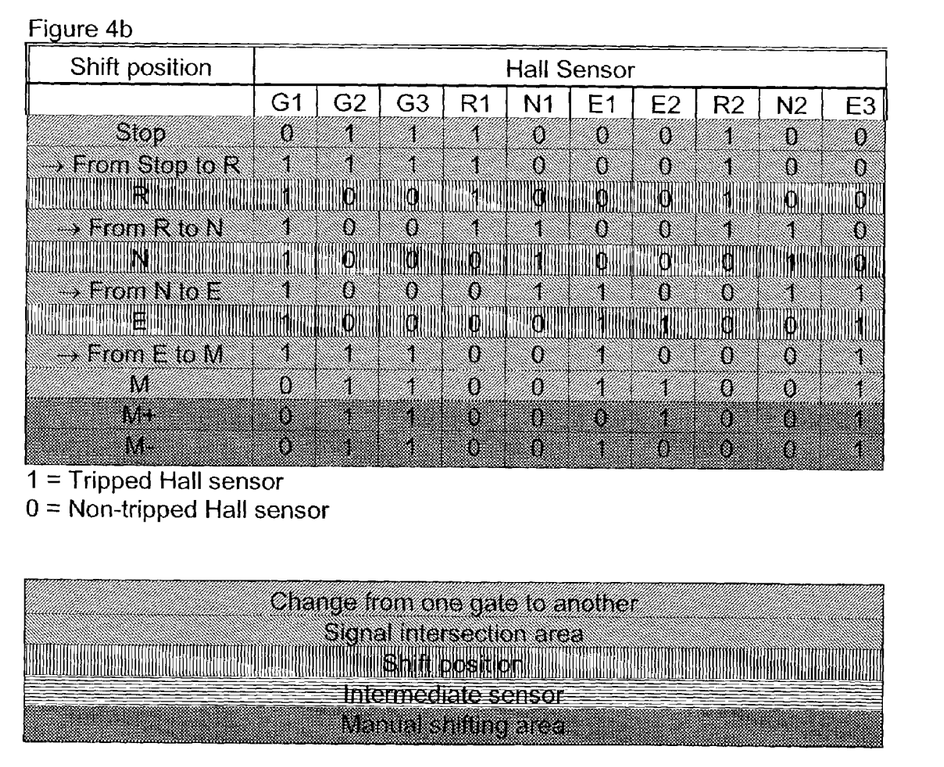
FIG. 4b is a list of the signals for different positions of the shift selector lever when different shift positions are assumed.

The table shown in FIG. 4b shows the different possible positions for the shift selector lever 3, including the signals occurring when the shift selector lever 3 assumes a certain shift position. In addition, the signals occurring when the shift selector lever 3 is moved correspondingly, i.e., the direction of movement of the shift selector lever 3 and the signal sequence formed in this case can also be seen in FIG. 4b. A tripped Hall sensor is designated by "1" and a non-tripped Hall sensor is designated by "0." The corresponding signal sequence and the corresponding signal present clearly show an unambiguous assignment to the defined position or shifting direction of the shift selector lever 3.

FIG. 4b shows and defines corresponding signals and signal sequences for corresponding movements of the shift selector lever 3. Based on the redundant system embodied here by means of the sensor system 1, namely, the main measuring track 11 and the redundancy measuring track 12, the control device or a corresponding processor can detect the failure of an individual sensor, when an individual sensor element fails or even the corresponding signal transmitter "is released." For example, when a signal transmitter, e.g., the Magnet R, is released, the redundancy measuring track 12 fails and the signals E3, N2 and R2 always remain equal to "0," because the corresponding sensor elements are not tripped, whereas the first sensor elements of the first main measuring track 11 are still tripped, because the Magnet A is not released. The control device will then detect a corresponding disturbance from the different signals sent to the control device or the processor unit and it can report this, e.g., to the driver by an acoustic warning signal.

In other words, corresponding signal sequences are predefined by means of the logic switching table shown in FIG. 4b when the shift selector lever 3 is moved from a certain shift position into another shift position, or certain signals are defined when the shift selector lever 3 assumes a certain shift position. Two signal series are present quasi always by means of the main measuring track 11 and the redundancy measuring track 12. In case of a change or incorrect presence of the signals, the control device or the processor unit detects an error message, i.e., an error can be set, so that the driver of the motor vehicle can be correspondingly warned.

Another advantage of the sensor system 1 being shown here is that the safest driving state can always be engaged within the transmission by means of the control device or the processor unit arranged upstream of a transmission control device even when the shift selector lever 3 assumes an "intermediate position." If the shift selector lever 3 assumes, e.g., an "intermediate position" between the position Neutral N and the position Reverse R, this "intermediate position" is registered by the control device, but the neutral position is set in the transmission for safety reasons. If, e.g., the shift selector lever 3 assumes a position between the position Forward E and the position Neutral N, the shifting state Neutral, i.e., the neutral position is likewise set in the transmission, because it should be avoided that the vehicle unintentionally engages, e.g., a forward gear. In other words, the safest driving state or shifting state can always be engaged in the transmission even in the case of an "intermediate position" of the shift selector lever 3 due to the fact that the "intermediate position" of the shift selector lever 3 is also detected, and shifting problems are thus eliminated.

The invention claimed is:

1. A sensor system for a control device of an automatically shiftable transmission with automatic manually shifted transmission, the system comprising:
   a shift selector lever movable in at least one shift gate for setting at least the positions Forward, Neutral, Reverse, and Park stop, and a position for manual shifting with an at least one position for the manual upshifting and/or a position for the manual downshifting of the gears of the transmission;
   first sensor elements, each first sensor element of said sensor elements being associated with a respective one of said positions;
   a first signal transmitter arranged at said shift selector lever to detect the position of said shift selector lever, said first sensor elements and/or said first signal transmitter being arranged to detect a positioning of said shift selector lever at least between the positions Forward, and Neutral and/or between the positions Neutral and Reverse, wherein the detection of a positioning of said shift selector lever at least between the positions Forward, and Neutral and/or between the Neutral and Reverse positions includes a dimensioning and/or the design of said first sensor elements and/or of said first signal transmitter to provide a first detection overlap area formed between the positions Forward and Neutral as well as a second detection overlap area formed between the positions Neutral and Reverse.

2. A sensor system in accordance with claim 1, wherein said first sensor elements comprise Hall position transducers and said first signal transmitter comprises a permanent magnet.

3. A sensor system for a control device of an automatically shiftable transmission with automatic manually shifted transmission, the system comprising:
   a shift selector lever movable in at least one shift gate for setting at least the positions Forward, Neutral, Reverse, and Park stop, and a position for manual shifting with an at least one position for the manual upshifting and/or a position for the manual downshifting of the gears of the transmission;
   first sensor elements, each first sensor element of said sensor elements being associated with a respective one of said positions;
   a first signal transmitter arranged at said shift selector lever to detect the position of said shift selector lever, said first sensor elements and/or said first signal transmitter being arranged to detect a positioning of said shift selector lever at least between the positions Forward, Neutral and/or Reverse, wherein the detection of a positioning of said shift selector lever at least between the positions Forward, Neutral and/or Reverse positions includes a dimensioning and/or the design of said first sensor elements and/or of said first signal transmitter to provide a first detection overlap area formed between the positions Forward and Neutral as well as a second detection overlap area formed between the positions Neutral and Reverse, further comprising second sensor elements each second sensor element of said second sensor elements being associated with a respective one of said positions of said shift selector lever, and a second signal transmitter arranged at said shift selector lever.

4. A sensor system in accordance with claim 3, wherein said second sensor elements comprise Hall position transducers, and said second signal transmitter comprises a permanent magnet.

5. A sensor system in accordance with claim 3, wherein due to the dimensioning and/or the design of said second sensor elements and/or of said second signal transmitter detection overlap areas are formed between the positions Forward and Neutral as well as between the positions Neutral and Reverse.

6. A sensor system in accordance with claim 3, wherein said first and second sensor elements are arranged on a board.

7. A sensor system in accordance with claim 1, wherein a main measuring track is formed by said first sensor elements, and a redundancy measuring track is formed by said second sensor elements.

8. A sensor system in accordance with claim 1, wherein said shift selector lever can be moved via a transverse gate into a tipping gate and a first tipping gate sensor element each is provided for the positions for upshifting and/or downshifting.

9. A sensor system in accordance with claim 3, wherein said first and second sensor elements are arranged on a board and the board is arranged movably in the direction of said transverse gate within a shift selector lever housing.

10. A sensor system in accordance with claim 3, further comprising third sensor elements and third signal transmitters wherein the positioning of said shift selector lever within said transverse gate can be detected by said third sensor elements and said third signal transmitters.

11. A sensor system in accordance with claim 10, wherein said third sensor elements comprise Hall position transducers and said third signal transmitters comprise permanent magnets.

12. A sensor system in accordance with claim 10, wherein said first and second sensor elements are arranged on a board and the board is arranged movably in the direction of said transverse gate within a shift selector lever housing and said third sensor elements are arranged on the board and said third signal transmitters are arranged on the shift selector lever housing.

13. A sensor system in accordance with claim 10, wherein a detection overlap area is also formed by said third sensor elements and by said third signal transmitters.

14. A sensor system in accordance with claim 10, wherein the sensor system is embodied as an electronic system and said sensor elements are connected to control circuitry.

15. A sensor system in accordance with claim 10, further comprising a control device wherein a malfunctioning and/or nonfunctioning sensor element and/or a short circuit in the sensor element can be detected by means of the control device.

16. A sensor system in accordance with claim 15, wherein the control device is designed as a processor unit which can be integrated within the shift selector lever housing.

17. A sensor system in accordance with claim 16, wherein the processor unit is integrated within the shift selector lever housing and is arranged upstream of a transmission control device.

18. A sensor system for the control device of an automatically shiftable transmission, the system comprising:
a shift selector lever movable in at least one shift gate for setting at least a forward position, a neutral position, a reverse position, and a park position;
a plurality of first sensor elements, each first sensor element of said plurality of first sensor elements being associated with a respective one of said forward position, neutral position, reverse position, and park position;
a signal transmitter arranged for movement with movement of said shift selector lever to detect the position of said shift selector lever at a respective said sensor element, each said sensor element and/or said signal transmitter being disposed relative to each other and relative to said shift lever to form detection overlap areas between said forward position and said neutral position and between said reverse position and said neutral position to detect a positioning of said shift selector lever at least between said forward position and said neutral position and between said reverse position and said neutral position;
a plurality of second sensor elements, each second sensor element of said plurality of second sensor elements being associated with a respective one of said forward position, neutral position reverse position, and park position; and
a second signal transmitter arranged for movement with movement of said shift selector lever, said second sensor elements and/or said second signal transmitter being disposed relative to each other and relative to said shift lever to form detection overlap areas between said forward position and said neutral position and between said reverse position and said neutral position to detect a positioning of said shift selector lever at least between said forward position and said neutral position and between said reverse position and said neutral position.

19. A sensor system for a control device of an automatically shiftable transmission with automatic manually shifted transmission, the system comprising:
a shift selector lever movable in at least one shift gate for setting at least the positions Forward, Neutral, Reverse, and Park stop, and a position for manual shifting with and at least one position for the manual upshifting and/or a position for the manual downshifting of the gears of the transmission;
first sensor elements respectively associated with each possible position;
a first signal transmitter arranged at said shift selector lever to detect the position of said shift selector lever, said first sensor elements and/or said first signal transmitter being arranged to detect a positioning of said shift selector lever at least between the positions Forward, Neutral and/or Reverse;
second sensor elements respectively associated with each possible position of said shift selector lever; and
a second signal transmitter arranged at said shift selector lever, wherein a main measuring track is formed by said first sensor elements, and a redundancy measuring track is formed by said second sensor elements and two of said first sensor elements are associated with the position Forward in the main measuring track and one of said second sensor elements is associated with the position Forward in the redundancy measuring track.

20. A sensor system in accordance with claim 1, wherein said first sensor elements further comprises:
a first forward sensor E1;

a second forward sensor E2;
a third neutral sensor N1; and
a fourth reverse sensor R1, wherein said second forward sensor E2 and said third neutral sensor N1 detect said shift selector lever located in said first detection overlap area and said third neutral sensor N1 and said fourth reverse sensor R1 detect said shift selector lever located in said second detection overlap area.

* * * * *